United States Patent Office

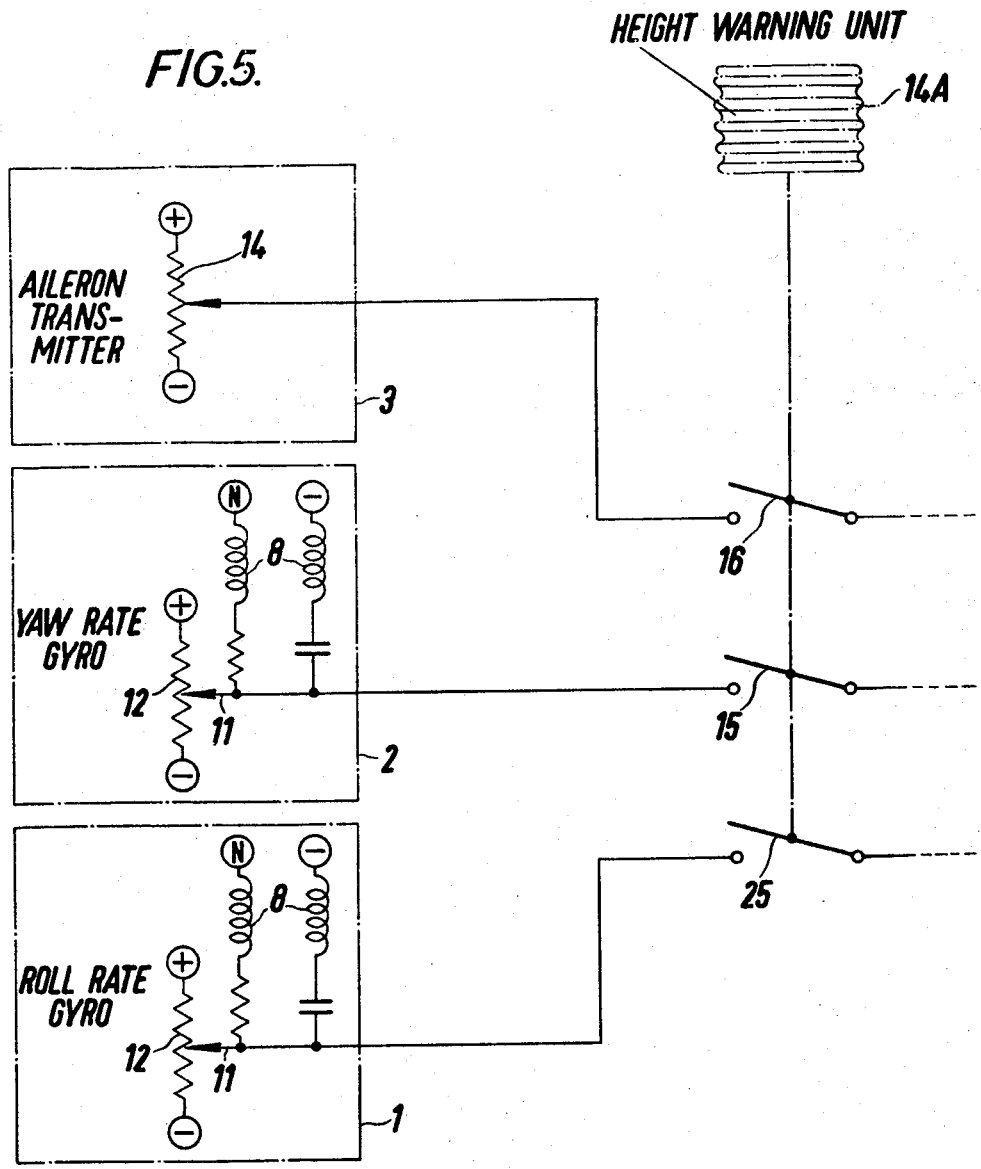

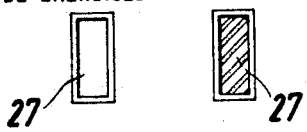
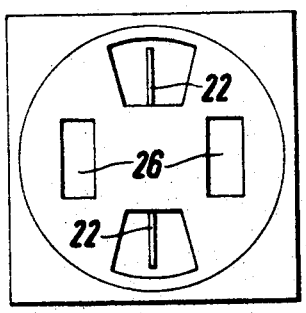
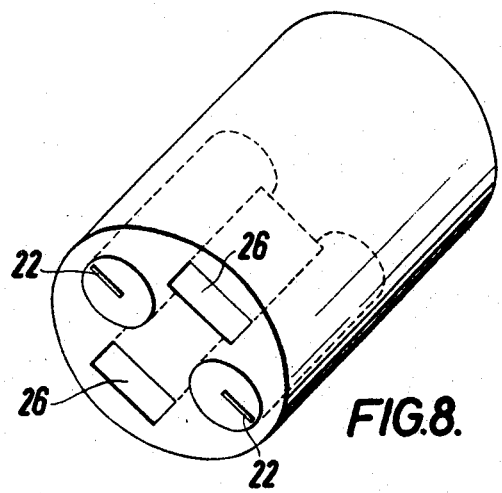
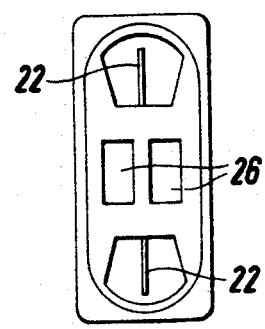
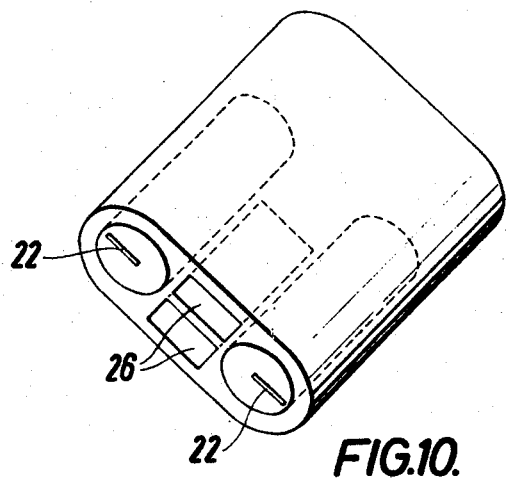
INVENTOR
DAVID V. W. HOSKINS

3,393,560
Patented July 23, 1968

---

3,393,560
SPIN INDICATOR SYSTEM
David V. W. Hoskins, London, England, assignor to Elliott Brothers (London) Limited, London, England
Filed Mar. 8, 1966, Ser. No. 532,723
5 Claims. (Cl. 73—178)

ABSTRACT OF THE DISCLOSURE

An aircraft spin indicating system employing a yaw rate gyro and a roll rate gyro for controlling an instrument presenting a visual indication to the pilot. The signal from the roll rate gyro is blocked until the yaw rate gyro produces a signal indicating a predetermined rate of yaw.

---

Figure 1:
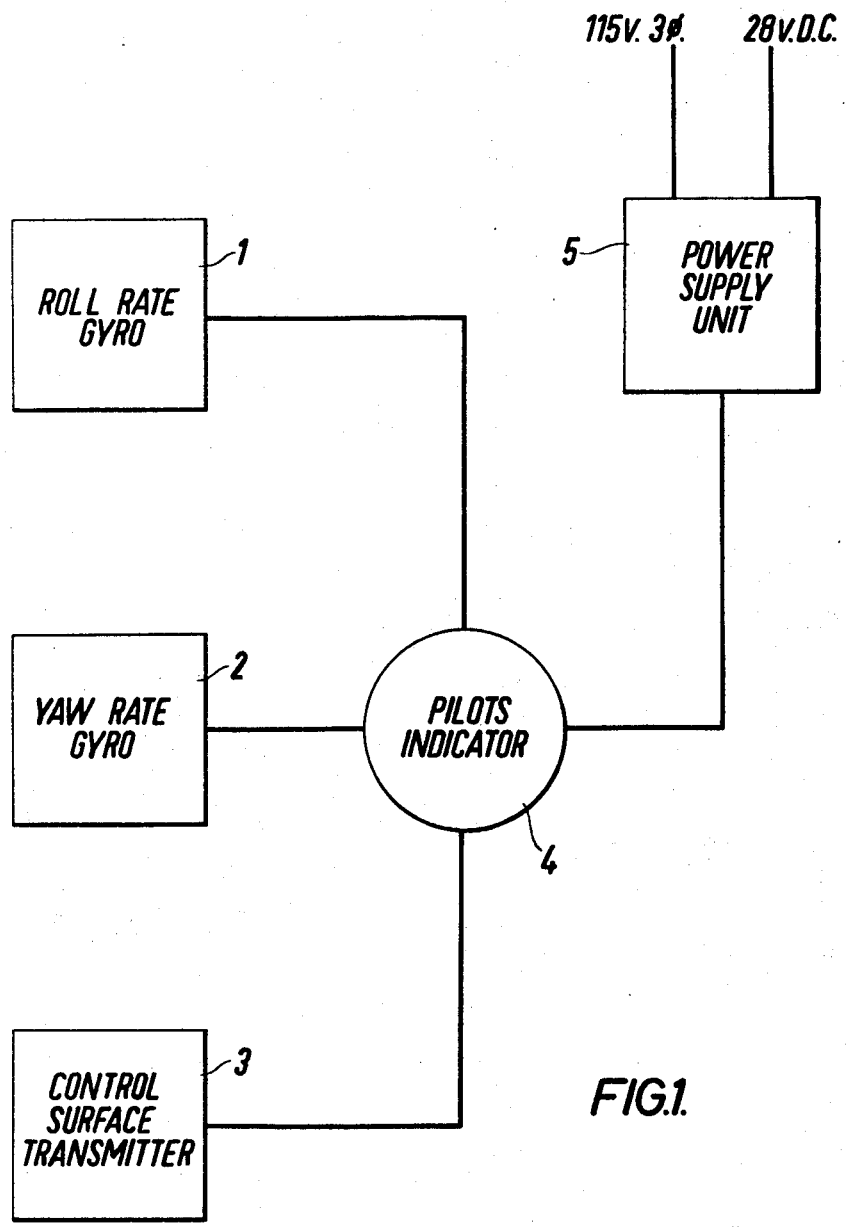

This invention relates to apparatus for indicating whether or not an aircraft is in a spin.

The spinning and recovering procedure of aircraft has, until fairly recent years, been a regularly practised and fully understood aerobatic manoeuvre. However, with the introduction of radical airframe designs, e.g., swept wings, very considerable variations in spin characteristics are met from aircraft to aircraft.

These characteristics may be quite violent and oscillatory in nature, causing disorientation of the pilot. In addition, it is necessary to apply a precise and optimum procedure if the aircraft's recovery is to be effected and at present the instrumentation of some aircraft does not present sufficient information to enable this procedure to be carried out. Furthermore, differentation between spinning in the normal and inverted planes becomes extremely difficult in the case of severe pitch oscillation.

There is thus a need for inter alia an apparatus which will provide the pilot with sufficient information to determine whether or not the aircraft is in an actual spinning condition and if so whether it is of the normal or inverted type.

According to one aspect of the invention an apparatus for indicating whether or not an aircraft is in a spin comprises the combination of a first and a second gyroscope for measuring the rates and senses of rotation of the aircraft about its vertical and longitudinal axes, means for presenting such measurements as indications to the pilot of the aircraft and means for blocking the indication of one of the gyroscopes until the other gyroscope indicates a predetermined rate of change of position of the aircraft. The indication of the second gyroscope may be blocked until the first gyroscope indicates a predetermined rate of yaw of the aircraft. There will thus be no indication of the rate of roll until the rate of yaw is such as is experienced in a spin or incipient spin.

According to a further aspect of the invention an apparatus for indicating whether or not an aircarft is in a spin comprises the combination of a first and a second gyroscope for measuring the rates and senses of rotation of the aircraft about its vertical and longitudinal axes and a single instrument arranged so as to present the indications visually to the pilot.

A preferred feature of the apparatus is that it also combines devices for indicating the position of the ailerons or other control surfaces.

In the preferred arrangement of the invention the three indications, that is to say, rate and direction of yaw, rate and direction of roll, and aileron position, are all fed into a single instrument which gives the pilot a visual presentation of the measurements.

The instrument may be so arranged that in the event of a power failure the indicators will "fail safe" in that all pointers and indication will disappear off the scale.

In addition or alternatively a further indication may be provided to denote that there has been a power failure. These arrangements have the added advantage that in the case of a requirement for a minimum or safety height indication (i.e. the height below which recovery from the spin cannot be guaranteed) the interruption of the supply by a separate height actuated switch will immediately prompt the pilot.

From this instrument it is then possible for the pilot to deduce:

(a) whether the aircraft is in a spin condition, the direction of the spin and whether the spin is of the normal or inverted type;

(b) the degree of anti- or pro-spin aileron being applied.

This instrument may be calibrated as either a "command" or "state" instrument. That is to say, it may be used to instruct the pilot in the action to take to correct the manoeuvre or as a "state" indication to inform him of the actual manoeuvre the aircraft in performing.

Figure 2:
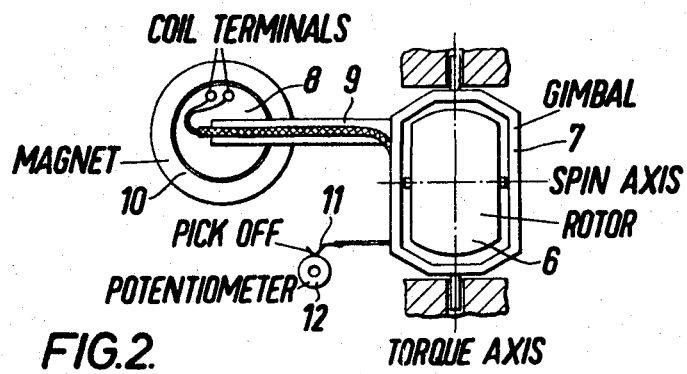
Figure 3:
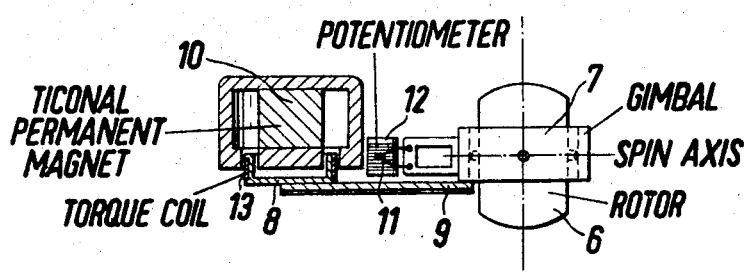
Figure 4:
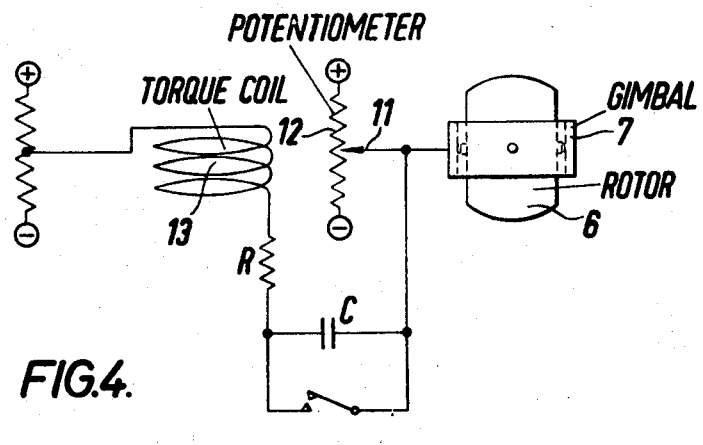
Figure 5A:
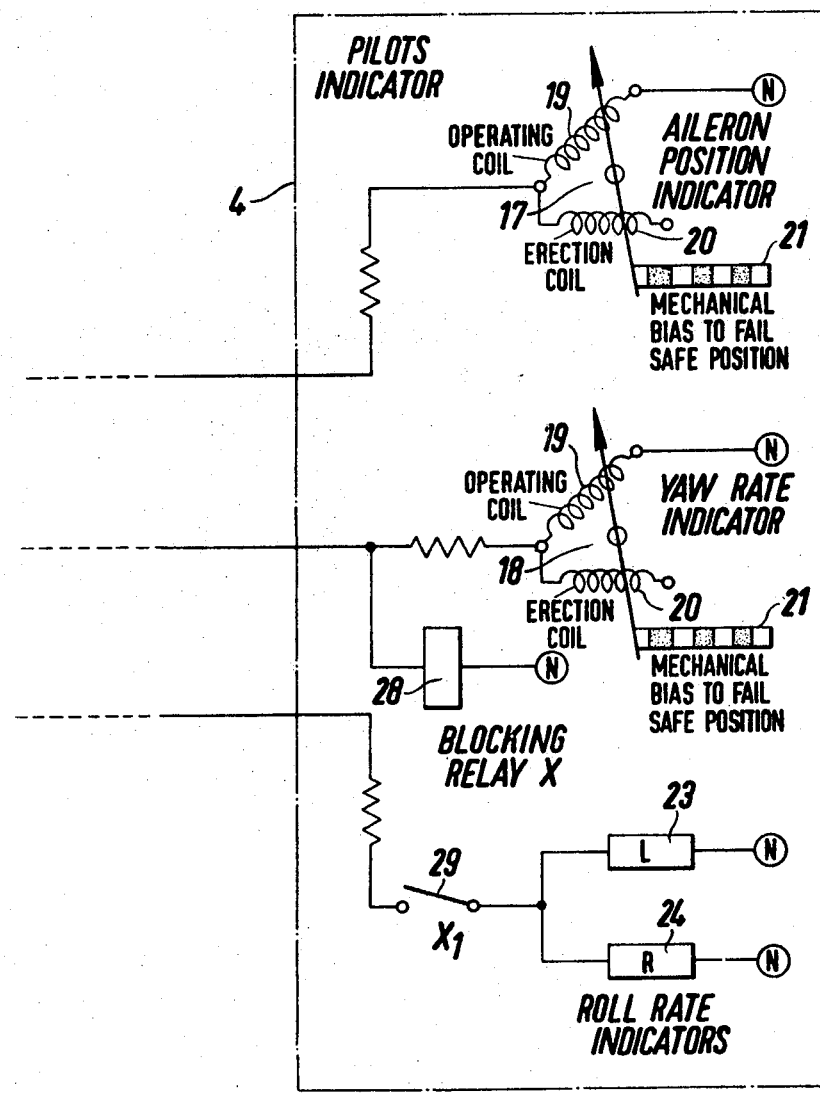

The preferred embodiment of the invention will now be described and illustrated with reference to the accompanying drawings, in which:

FIGURE 1 is a block diagram of the apparatus;
FIGURES 2, 3 and 4 show the arrangement of a gyroscope;
FIGURES 5 and 5A illustrate an electrical circuit diagram of the apparatus;
FIGURE 6 shows the pilot's view of the aileron position indicator;
FIGURES 7 and 8 show one arrangement of the pilot's indicator, and
FIGURES 9 and 10 show an alternative arrangement of the indicator.

Referring to FIGURE 1, a roll rate gyroscope 1, a yaw rate gyroscope 2 and a control surface transmitter 3 are shown connected to a pilot's indicator 4. The apparatus also includes a power supply unit 5.

The rate gyros used to provide roll and yaw rate signals are of the "electrical spring" type, the mechanical construction and the outputs from each being identical and shown in FIGURES 2, 3 and 4.

Each gyro consists of a 1.5 in. hysteresis motor 6 mounted in a single gimbal 7 to give a precessional troque which is proportional to the rate of the instruments rate of rotation about its sensitive axis. A multi-coil assembly 8 is mounted on an arm 9 carried by the gimbal ring, so positioned as to move axially in the air gap of a permanent magnet assembly 10. A second gimbal arm carries an electrical contact 11 across the face of a D.C. potentiometer 12. The voltage picked off by this contact is then fed through one of the coils 13 of the moving assembly so that the magnetic interaction of the coil assembly and the permanent magnet is such to oppose the precessional torque. Thus, the gyro precesses against an "electrical spring" and this precession will continue until the two forces are balanced. The amount of precession will therefore be proportional to the precessional torque and consequently to the rate of rotation of the unit.

The additional coils provided on the moving coil assembly are used to adjust the damping of the unit or to induce an artificial precessional rate.

The aileron position transmitter consists of a D.C. potentiometer 14 whose pick-off is attached to a suitable point in the aircraft's aileron control run. With the ailerons in the neutral (i.e., central position) the potentiometer is arranged to provide an electrical neutral (i.e., to pick-off the voltage at the central point of the potentiometer). Therefore, the voltage picked off either side of this point by any movement of the aircraft ailerons will be representative of the deflection of the ailerons from their neutral position.

The varying voltage requirements of the system are met by the provision of a power unit 5. This unit houses the following:

(i) Transformers to provide 30 v. 3 phase rate gyro supply from the aircraft's 115 v. 3 phase supply, or (ii) Capacitance networks and transformers to provide 30 v. 3 phase from the aircraft's 115 v. single phase supply.

The apparatus also includes a height warning unit 14A. The height warning unit is operable to control the switches 15, 16 and 25 to close them only when the aircraft is above that altitude below which recovery from the spin can not be guaranteed.

The electrical circuit is shown in FIGURE 5. The yaw rate gyroscope 2 and the aileron position indicator 3 are each connected through switches 15 and 16 to two miniature moving coil assemblies 17 and 18, each of which has an operated coil 19, an erection coil 20 and a mechanical fail-safe bias 21. Each assembly operates a moving pointer 22 on the pilot's indicator, shown in FIGURES 7, 8, 9 and 10. The upper pointer indicates aileron position, and the lower pointer indicates rate of yaw.

The roll rate gyroscope operates two miniature combined relay and mechanical indicators 23 and 24 through a switch 25. These units are relays in which a lever movement is extended from an armature to actuate a prismatic roller contained within the longitudinaly extended case of the relay. The end wall of the relay contains a window 26 so that mechanical operation of the relay is indicated by the rotation of the roller to present a new face of the prism. These indicators are positioned so that their prism faces 27 are presented at the three o'clock and nine o'clock positions on the dial and are used to indicate direction and rate of roll. The signal to these indicators is blocked by a relay 28 operating contacts 29 until such time as the signal from the yaw rate gyroscope is sufficiently high to indicate that the aircraft is spinning.

It should be appreciated that although in the embodiment disclosed the indication of rate of roll of the aircraft is blocked until a predetermined rate of yaw is indicated the opposite arrangement could be utilised i.e., the indication of rate of yaw is blocked until a predetermined rate of roll of the aircraft is indicated. Also if required the blocking can be dispensed with altogether.

If the instrument is to be calibrated for "command" as opposed to "state," all that is necessary is to reverse the D.C. potential across both the potentiometers 12.

I claim:

1. An apparatus capable of indicating whether or not an aircraft is in a spin comprising the combination of a first and a second gyroscope for measuring the rates and senses of rotation of the aircraft about its vertical and longitudinal axes, means for presenting such measurements as indications to the pilot of the aircraft and means for blocking the indication of one of the gyroscopes until the other gyroscope indicates a predetermined rate of change of position of the aircraft and a device for indicating the position of the ailerons of the aircraft.

2. An apparatus capable of indicating whether or not an aircraft is in a spin comprising the combination of a first and a second gyroscope for measuring the rates and senses of rotation of the aircraft about its vertical and longitudinal axes, means for presenting such measurements as indications to the pilot of the aircraft and means for blocking the indication of one of the gyroscopes until the other gyroscope indicates a predetermined rate of change of position of the aircraft, all indications being visually presented to the pilot by means of a single instrument, said single instrument also being capable of indicating the position of the ailerons of the aircraft.

3. An apparatus capable of indicating whether or not an aircraft is in a spin comprising the combination of a first and a second gyroscope for measuring the rates and senses of rotation of the aircraft about its vertical and longitudinal axes, means for presenting such measurements as indications to the pilot of the aircraft and means controlled by one gyroscope for blocking the indication of the other gyroscope until said one gyroscope indicates a predetermined rate of change of position of the aircraft, said means for presenting comprising an instrument having a pointer which deflects out of sight in the event of a failure of electric power and/or a further indication is provided to denote such failure of electric power.

4. An apparatus capable of indicating whether or not an aircraft is in a spin comprising the combination of a first and a second gyroscope for measuring the rates and senses of rotation of the airoraft about its vertical and longitudinal axes, means for presenting such measurements as indications to the pilot of the aircraft and means for blocking the indication of one of the gyroscopes until the other gyroscope indicates a predetermined rate of change of position of the aircraft, each gyroscope having a single gimbal ring carrying a multi-coil assembly mounted so as to move axially in the air gap of a permanent magnet assembly, the gimbal ring also operating a direct current potentiometer the voltage from which is fed into one of the coils of the multi-coil assembly, the whole being so arranged that the interaction between the magnetic fields of the multi-coil assembly and of the permanent magnet assembly produce a force opposing the precessional torque of the gyroscope.

5. An apparatus capable of indicating whether or not an aircraft is in a spin comprising the combination of a first and a second gyroscope for measuring the rates and senses of rotation of the aircraft about its vertical and longitudinal axes, means for presenting such measurements as indications to the pilot of the aircraft and means for blocking the indication of one of the gyroscopes until the other gyroscope indicates a predetermined rate of change of position of the aircraft and a safety height indicator for indicating the minimum height at which recovering from a spin is possible.

References Cited

UNITED STATES PATENTS

| | | | |
|---|---|---|---|
| 2,512,279 | 6/1950 | Jones | 33—204.1 |
| 3,045,356 | 7/1962 | Uecker | 33—204 |
| 3,062,048 | 11/1962 | Heald et al. | 73—178 |

S. CLEMENT SWISHER, *Acting Primary Examiner.*

NEIL B. SIEGEL, *Assistant Examiner.*